Figure 3:
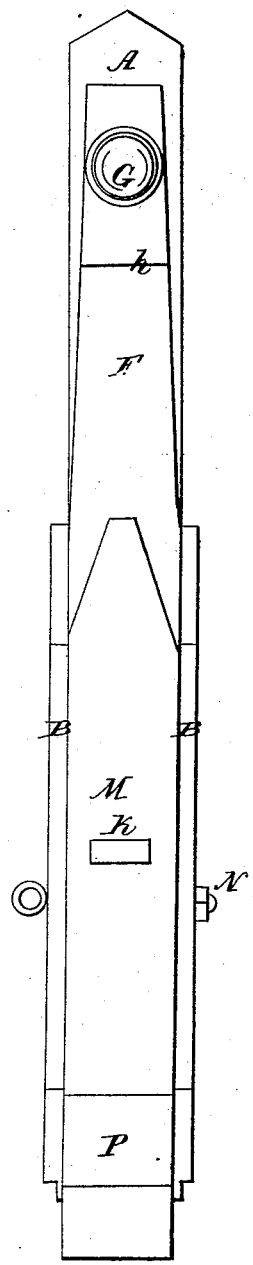

J. HAINES.

Hand-Seeder.

No. 18,145.

Patented Sept. 8, 1857.

UNITED STATES PATENT OFFICE.

JOEL HAINES, OF WEST MIDDLEBURG, OHIO.

IMPROVEMENT IN HAND SEED-PLANTERS.

Specification forming part of Letters Patent No. 18,145, dated September 8, 1857.

*To all whom it may concern:*

Be it known that I, JOEL HAINES, of West Middleburg, in the county of Logan and State of Ohio, have invented certain new and useful Improvements in Seed-Planters; and I do hereby declare that the same are described and represented in the following specification and drawings.

To enable others skilled in the art to make use my improvements, I will proceed to describe their construction and operation, referring to the drawings, in which the same letters indicate like parts in each of the figures.

Figure 2:
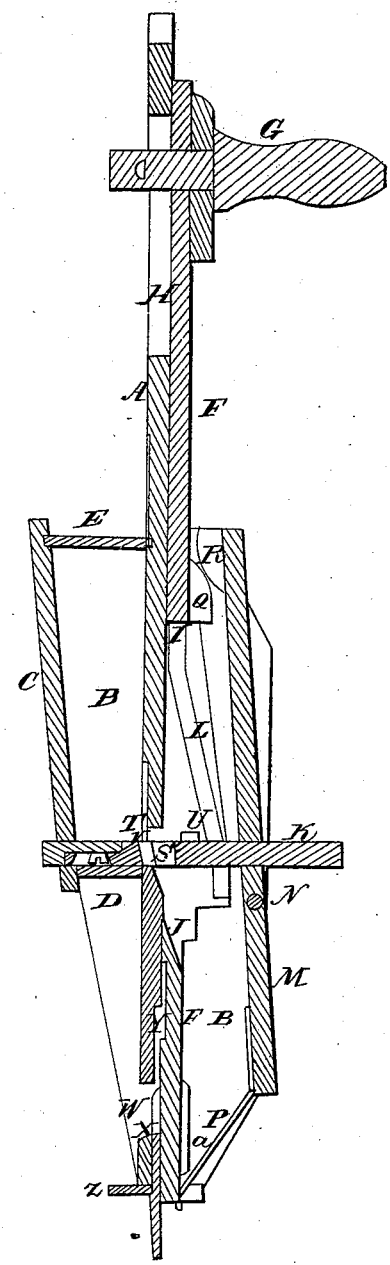
Figure 1:
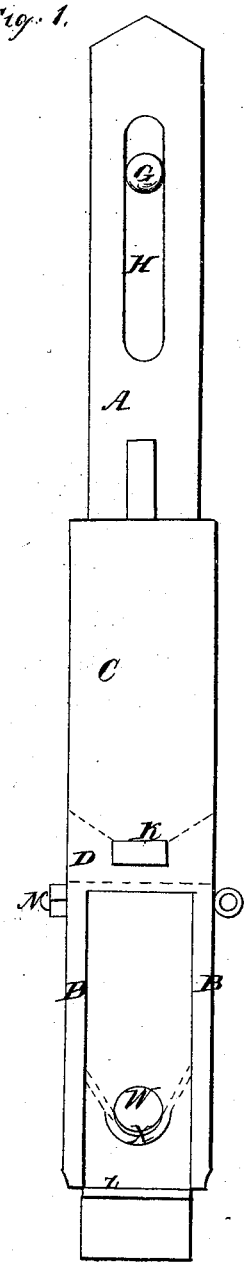

Figure 1 is a front elevation of the planter. Fig. 2 is a section through the line $z\,z$, Fig. 1. Fig. 3 is an elevation of the rear of the planter.

The nature of my invention consists in making an opening through the standard of the planter near its lower end, so arranged as to form a bar or scraper to clear the wet earth from the plunger as it is pushed down to deposit the seed, thereby enabling the farmer to use the planter in wet land.

In the accompanying drawings, A is the standard of the machine, to which the sides B B are fastened in such a position that they project both in front and rear of the standard, as shown in the section, Fig. 3. The front C of the seed-box is fastened to the front edges of the sides B B and to the bottom D. (Shown in dotted lines in Fig. 1.) E is the cover of the seed-box.

F is the plunger, provided with a handle, G, by which it is operated, and the end of the handle passes through the standard A and moves in the slot H, which governs the distance traversed by the plunger, which plunger has a long slot in it, from I to J, to permit it to traverse perpendicularly, while the seed-slide K traverses through it horizontally to deliver the seed, being operated by the inclined bar L, fastened to the plunger F, and working in a score in the side of the slide K, which traverses through the front C and rear M, as shown in section, Fig. 2. The rear M is fitted to vibrate between the sides B B on the pin N, which passes through it and through the sides. It is operated by the lower end of the plunger acting against the plate P, fastened to the lower end of the rear M, and by the cam Q, fastened to the plunger, and acting against the cam R, fastened to the upper end of the rear M, as shown in the drawings. There is a score in the bottom of the seed-box, to which score the slide K is fitted, and provided with an opening, S, to receive the seed which falls into it when it is pushed into the seed-box by the incline L when the plunger is pushed down, and when the plunger is drawn up the slide is drawn, so as to bring the opening S over the space between the standard A and rear M, and allow the seed to fall down onto the plate P, and as the plunger is drawn up the seed passes under the end of it, and are held between the plate P and the standard A until the plunger is pushed down to force the seed out and deposit it in the ground. When plunger is pushed down, the opening in the slide is pushed into the seed-box and filled, and as the plunger is drawn up the slide is drawn out, and the seed falls from the opening, as before mentioned.

There is a piece of leather, T, fastened to the standard, so as to yield when the seed in the opening passes under it, and not injure the seed. This piece of leather is pushed into the seed-box, every time the slide is run, in by the knob U on the slide. The size of the opening S may be varied by moving the piece V, and fastening it, in the position desired, by the screw shown in section, Fig. 2.

In planting moist or wet land with the hand seed-planters heretofore made the earth adheres to the front of the plunger, and is carried in between the plunger and the standard, and is rolled by the traversing of the plunger, so as to entirely defeat their use in wet land. This defect has been long and loudly complained of by the farmers, which has induced me to make an effort to remedy it, which I have succeeded in doing by making a recess, Y, in the standard and plunger, and an opening, W, through the standard at the lower end of the recess, which is provided with a metal scraper or plate, X, fastened to the lower end of the standard, so as to form a bar to scrape the wet earth from the plunger as it is forced down, and pass it out through the opening W, and prevent it from rolling up and clogging the planter. I prefer a scraper made circular, or V-shaped at its upper edge to turn the earth scraped off from the sides toward the center and facilitate its exit out of the hole W. The stop Z is fastened to the lower end of the standard to gage the depth at which the seed is deposited. There are guides fastened to the sides B B, one of which is shown at $a$, Fig. 2, to hold the plunger against the standard and scraper.

My devices which scrape the wet earth from the plunger enable the farmer to use it in planting wet land with nearly or quite the same facility that he can other planters in dry land.

I believe I have described and represented my improvements in seed-planters so as to enable any person skilled in the art to make and use them.

I will now state what I desire to secure by Letters Patent, to wit:

The opening W through the standard, or its equivalent, so arranged as to form a bar or scraper, substantially as described, to clear the earth or wet earth from the plunger as it is pushed down, and deliver it out through the opening W, as described, whether the upper edge of the scraper is curved or otherwise.

JOEL HAINES.

Witnesses:
  J. DENNIS, Jr.,
  JOHN S. HOLLINGSHEAD.